Sept. 29, 1931.  W. CHAPLIN  1,825,050

NUT LOCK

Filed Jan. 5, 1931

Inventor
William Chaplin,
By Henry Orth Jr.
Atty.

Patented Sept. 29, 1931

1,825,050

UNITED STATES PATENT OFFICE

WILLIAM CHAPLIN, OF PARIS, FRANCE

NUT LOCK

Application filed January 5, 1931, Serial No. 506,788, and in Germany January 10, 1930.

My invention relates to nut locks consisting of a plate mounted on the bolt for preventing unscrewing of the nut.

The object of my invention is to provide a locking device of that type which is easy to mount and to fix, is very safe and efficient and does not make it necessary to produce a permanent deformation of the portion of the bolt that is in contact with the nut lock.

The nut lock according to my invention consists of a plate provided with an elongated orifice or slot adapted to receive the bolt. Said slot is wider at one end than at the other so that the wider end can easily be slipped on the bolt with a sufficient play. On the contrary the other end is narrower than the diameter of the bolt. These extreme portions are connected by continuous walls parallel to the axis of the bolt gradually converging toward the narrow end of the slot, whereby there is always tangential contact between the walls of the locking plate slot and the bolt. Means are also provided on said plate for locking it with respect to a nut screwed on the bolt.

It will readily be understood that when the plate, after being inserted on the bolt, is forced in a lateral direction opposed to the narrow end of the slot, the walls of the slot are forcibly applied against the bolt, the pressure increasing with the displacement imparted to the plate with respect to the bolt. In order to facilitate this displacement the walls of the slot are made as smooth as possible. When said pressure has sufficiently increased it becomes capable of preventing any rotation of the bolt with respect to the plate. The nut is then tightened and the means for locking the plate with respect to the nut are applied. Said means advantageously serve also to transversely maintain the plate in its position with respect to the bolt, so that the nut, the locking plate and the bolt form a single unit and vibrations are entirely without effect upon the nut which is safely locked on the bolt.

It will be noticed that, according to my invention, the bolt shank needs not be permanently deformed by the locking plate, since elastic deformation is fully sufficient for preventing any rotation of the bolt with respect to the plate. Furthermore, owing to the fact that the walls of the slot gradually converge toward the narrow end thereof, the pressure exerted on the bolt also gradually increases when the plate is laterally forced on the bolt, and no shearing action is to be feared. Therefore the force of friction between the bolt and the plate is the only resistance to be overcome for wedging the bolt between the walls of the slot to a position where said pressure exerted on the bolt will be sufficient for strictly preventing any rotation of the bolt with respect to the plate.

In a preferred embodiment of my invention, the locking plate will preferably have a rectangular outline and will be cut from sheet iron as an ordinary washer. The end portions of the slot will be semicircular and the line connecting said portions will preferably be parabolic in shape. The radius of the larger semicircular portion will be slightly greater than that of the bolt so as to afford a certain play. The radius of the smaller semi-circular portion will be equal to the length of the normal to the parabolic outline of the slot at the point where said line meets said semi-circular end. The wedging action will be more or less strong according to the value of the parameter of the parabol. Advantageously said parameter will be chosen equal to one-tenth of the radius of the bolt shank.

The means for locking the plate with respect to the nut can be of any suitable type, but it is advantageous to use for this purpose an edge of the plate, which is bent upward against the face of the nut when the latter is tightened.

My invention further comprises another embodiment of said means for locking the plate with respect to the nut which consists of a projection of a suitable shape provided on the upper side of the plate and adapted to engage the edges of the nut, whereby further rotation of the plate in the tightening direction will move the plate in a lateral direction with respect to the nut, so as to produce the locking action.

Preferred embodiments of my device will be hereinafter described with reference to the appended drawings, given merely by way of example, in which.

Figure 1:
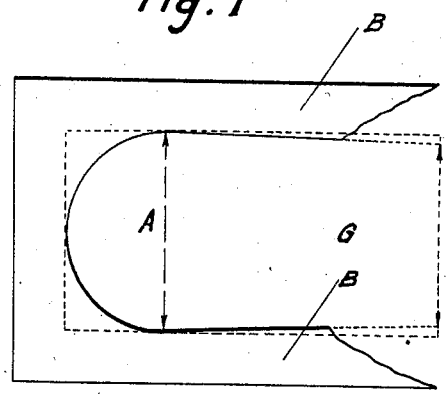
Fig. 1 is a diagrammatic view showing at an enlarged scale the slot in the nut lock plate.

Adverting to Fig. 1, the semi-circular portion of the slot in the locking plate is shown in A. The tapering portion G of said slot is limited by two branches B, which may be rectilinear or parabolic or of any suitable shape converging toward each other and toward the longitudinal axis of the slot in the direction opposite semi-circular end A. Said branches can be joined to each other in any desired manner. When it is desired to secure the locking plate on the bolt, a motion is imparted to said plate so as to bring the bolt shank between the inclined branches B which are strongly applied against said shank like two jaws. The general inclination of the branches or sides B may vary according to the case. The less inclined the branches are, the more the plate moves with respect to the bolt, and the stronger is the wedging action thereon. It is advantageous that the walls of the slot should be as smooth as possible in order to facilitate displacement of the bolt in the slot.

When the wedging action is sufficient for preventing any rotation of the bolt in the plate, there remains, as above stated, to lock the plate with respect to the nut, in order that the latter may not get loose. Said result may be obtained in several manners.

Figure 4:
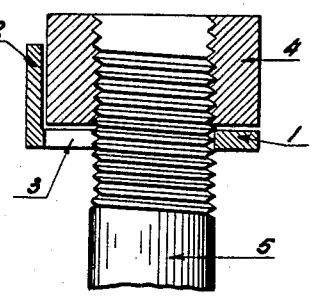
Fig. 4 is a vertical section on the line 4—4 of Fig. 3.
Figure 2:
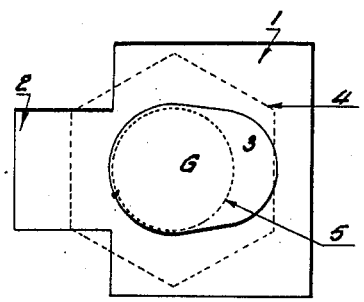
Fig. 2 is a plan view of a locking device according to my invention with the bolt and nut shown in dotted lines, the parts being in their position prior to the locking.
Figure 3:
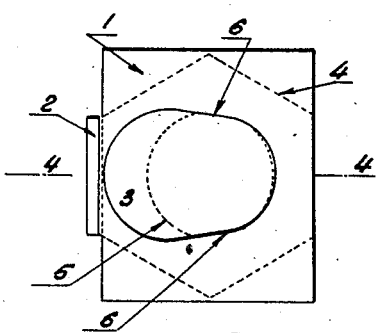
Fig. 3 is a similar view showing the same parts in the position they occupy when the bolt has been locked with respect to the plate.

Adverting first to Figs. 2, 3 and 4, it will be seen that 5 is a bolt and 1 a locking plate according to my invention. Said plate is provided in its central part with a slot 3, which comprises, as in the case of Fig. 1, a semicircular part corresponding to portion A of said figure and a tapering part limited by two branches of suitable shape converging toward the direction opposite portion A, said tapering part G serving to press against the bolt during the locking operation. Said branches are joined by a circular line, the diameter of which is smaller than that of A. The branches of the slot are tangent to both circumferential end portions. The distance between the centers of said circumferences depends upon the pressure that it is desired to exert through the locking plate upon the bolt. Said pressure increases when the distance between said centers is increased.

In order to effect the locking, the plate is driven on the bolt, from right to left in Figs. 2 and 3, that is to say from G toward A, so as to bring it into the position shown in Fig. 3. The elastic deformation of the branches of portion G of the locking plate, when so driven on the bolt, strongly presses said branches or walls upon the bolt. It is thus possible to very efficiently prevent any relative rotation between the bolt and the plate, but it should be noticed that during the driving of the plate on the bolt of the walls of the slot are always tangential to the bolt section, so that no shearing of the bolt need be feared.

In order to obtain a more gradual wedging action I have found it advantageous to give branches G a parabolic shape, with a parameter of the parabol equal to one-tenth of the radius R of the bolt shank, and to give the tapering part G a length equal to $$R + \frac{1}{4}R.$$

After the locking plate has been secured to the bolt, there remains to fixedly secure it to the nut. Said result may be obtained, as above stated, in several different ways. Likewise, the displacement of the locking plate with respect to the bolt can be effected in different ways.

In the embodiment of Figs. 2, 3 and 4, the external outline of the locking plate is rectangular, its longer side being parallel to a straight line passing through the centers of the circular end portions. Before the nut being fully tightened the locking plate is first hammered toward the left, for instance until it cannot be moved any more. The locking plate is then made integral with the nut by bending its end 2, by means of a hammer or any suitable tool, against a face of the nut so as to bring it into the position shown in Fig. 4. Said figure clearly shows the position occupied by the prolonged part 2 of the locking plate with respect to nut 4. In order to facilitate said bending the prolonged part 2 may have a width smaller than that of the plate, for instance equal to the width of one face of the nut, its length being equal to or slightly smaller than the height of the nut.

The thickness of the plate may be chosen of any suitable value, according to the nut. It is limited by the necessity of bending part 2 without too much difficulty.

Figures 5, 6, 7:
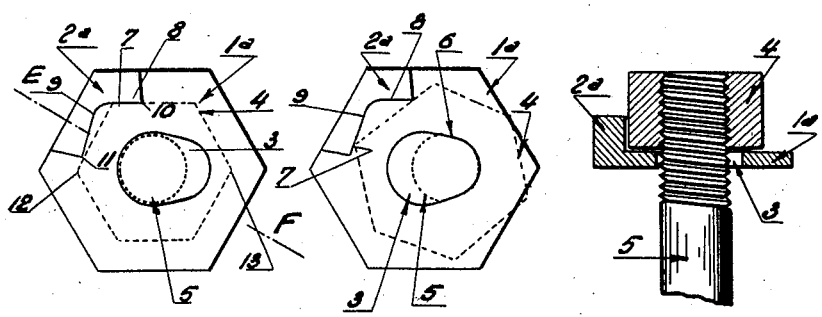
Figs. 5 and 6 are views analogous to Figs. 2 and 3 respectively showing another embodiment of my device.
Fig. 7 is a vertical section on the line 7—7 of Fig. 5.

When the position of the bolt does not allow of the end of the plate being bent against the nut it will be advantageous to make use of the embodiment shown in Figs. 5 to 7.

In this embodiment, the external outline of locking plate 1a is hexagonal, the side of the hexagon being equal to about 4/3 of that of the nut. It will be readily understood that said sizes are cited merely by way of example.

The slot in the plate has the same shape as that shown in Figs. 2 and 3. Its longitudinal axis is located along the straight line that passes through opposite apexes 12 and 13 of the hexagon.

The locking plate is provided with a flange 2a, upwardly directed, as shown in Fig. 7. Said flange consists of a thickened portion of the locking plate and its outer surface is preferably in line with the outer faces of the locking plate. The inner surface of the flange is intended to play the following part:

1. To drive the locking plate during the tightening of the nut.

2. To displace the locking plate with respect to the nut in order to effect the locking. For this purpose it consists of two distinct faces.

One of said faces 8 is adapted to apply against one of the faces of the nut from the edge 7 of the latter along about 1/3 of the length of said face. Said face of the nut drives the locking plate during the tightening of the nut through pressure against the face 8 of the locking plate flange.

In order that said driving of the plate may not determine the displacement of the locking plate toward the left, that is to say from G toward A, the flange is located above the angle 7 of the hexagon that immediately follows 12 in the direction of the tightening. The other face 9 of the inner surface of the flange starts from the angle 7 of the nut, follows a circle circumscribed about the section of the nut, and is then directed along a straight line toward a point located on the second face of the nut that forms angle 7, at a distance of the apex of said angle equal to about 3/4 of the length of said face.

Upon Fig. 5, the first point is shown in 10 and the second in 11.

The face 9 thus forms a ramp which deviates from the circle circumscribed about the hexagonal section of the nut. When the nut is fully tightened, the locking plate is rotated in the direction of tightening, for instance by means of a key.

During said rotation, the edge 7 of the nut slides along ramp 9, and thus forces the locking plate toward the left as clearly shown in Fig. 6. The inclined sides of the slot then exert pressure upon the bolt shank. If the nut got loose, the edge 7 would slide further on along ramp 9, up to a point corresponding to the full tightening of the locking plate. From that time on, the bolt, the locking plate and the nut form a single unit and the nut cannot rotate in the unscrewing direction.

While I have disclosed what I deem to be preferred forms of my device I do not wish to be limited thereto as there might be changes made in the construction, disposition and form of the parts without departing from the spirit of my invention as comprehended within the scope of the appended claims:

What I claim is:

1. A nut lock for preventing rotation of a nut with respect to a bolt which comprises a plate provided with an elongated slot adapted to receive the bolt having an end slightly larger than the bolt shank section and the other end substantially smaller than said section, said ends being connected by continuously converging walls parallel to the axis of the bolt, means for transversely fixing said plate with respect to said bolt, and means for locking said plate with respect to the nut, whereby the larger portion of the slot in the plate can be slipped over the bolt, the plate strongly forced in the direction that wedges the bolt between the sides of the slot and the means for fixing the plate with respect to the bolt and locking the plate with respect to the nut can then be applied.

2. A nut lock for preventing rotation of a nut with respect to a bolt which comprises a plate provided with an elongated slot adapted to receive the bolt having an end slightly larger than the bolt shank section and the other end substantially smaller than said section, said ends being connected by continuously converging walls parallel to the axis of the bolt, and a single means for simultaneously fixing said plate in the transversal direction with respect to said bolt and locking said plate with respect to the nut, whereby the larger portion of the slot in the plate can be slipped over the bolt, the plate strongly forced in the direction that wedges the bolt between the sides of the slot and the means for transversely fixing the plate with respect to the bolt and locking the plate with respect to the nut can then be applied.

3. Nut lock for preventing rotation of a nut with respect to a bolt which comprises a plate provided with an elongated slot adapted to receive the bolt having one circular end the diameter of which is slightly larger than that of the bolt and the opposite circular end substantially smaller in diameter than the bolt section, said ends being connected by rectilinear converging walls parallel to the axis of the bolt, and means for simultaneously fixing said plate in the transversal direction with respect to said bolt and locking said plate with respect to said nut whereby the larger portion of the slot in the plate can be slipped over the bolt, the plate strongly forced in the direction that wedges the bolt between the sides of the slot and the means for transversely fixing the plate with respect to the bolt and locking the plate with respect to the nut can then be applied.

4. Nut lock for preventing rotation of a nut with respect to a bolt which comprises a plate provided with an elongated slot adapted to receive the bolt having one circular end the diameter of which is slightly larger than that of the bolt and the opposite circular end substantially smaller in diameter than the bolt section, said ends being connected by continuously converging walls parallel to the axis of the bolt, and a prolonged part on said plate adapted to be upwardly bent for simultaneously fixing said plate in the transversal direction with respect to said bolt and locking said plate with respect to said nut whereby the larger portion of the slot in the plate can be slipped over the bolt, the plate strongly forced in the direction that wedges the bolt between the walls of the slot and the prolonged part for transversely fixing the plate with respect to the bolt and locking the plate with respect to the nut can then be bent into the suitable position.

5. Nut lock for preventing rotation of a nut with respect to a bolt which comprises a plate provided with an elongated slot adapted to receive the bolt having one circular end the diameter of which is slightly larger than that of the bolt and the opposite circular end substantially smaller than the bolt section, said ends being connected by continuously converging walls parallel to the axis of the bolt, an upwardly extending projection on said plate provided on its inner face with vertical surfaces having points at different distances from the axis of the bolt, said surfaces being inclined with respect to one another and adapted to cooperate with the outer lateral surface of the nut for simultaneously fixing said plate in the transversal direction with respect to said bolt and locking said plate with respect to said nut whereby the bolt, the nut and the plate are easily formed in a single unit.

6. Nut lock for preventing rotation of a nut with respect to a bolt which comprises a plate provided with an elongated slot adapted to receive the bolt having one circular end the diameter of which is slightly larger than that of the bolt and the opposite circular end substantially smaller than the bolt section, said ends being connected by continuous converging walls parallel to the axis of the bolt, an upwardly extending projection on said plate and two vertical surfaces inclined with respect to each other provided on the inner face of said projection, said surfaces having points thereon at different distances from the axis of the bolt, said surfaces being adapted to cooperate with two adjacent faces of the nut for simultaneously fixing said plate in the transversal direction with respect to said bolt and locking said plate with respect to said nut whereby the bolt the nut and the plate are easily formed in a single unit.

In testimony that I claim the foregoing as my invention, I have signed my name.

WILLIAM CHAPLIN.